United States Patent [19]

Sellergren

[11] Patent Number: 5,658,652

[45] Date of Patent: Aug. 19, 1997

[54] PANEL STRUCTURE FOR VEHICLES

[75] Inventor: Per-Ivar Sellergren, Torslanda, Sweden

[73] Assignee: AB Volvo, Sweden

[21] Appl. No.: 481,298

[22] PCT Filed: Dec. 29, 1993

[86] PCT No.: PCT/SE93/01111

§ 371 Date: Jun. 28, 1995

§ 102(e) Date: Jun. 28, 1995

[87] PCT Pub. No.: WO94/14629

PCT Pub. Date: Jul. 7, 1994

[30] Foreign Application Priority Data

Dec. 29, 1992 [SE] Sweden ................................. 9203921

[51] Int. Cl.$^6$ ........................................................ B32B 9/00
[52] U.S. Cl. .................. 428/71; 428/76; 428/159; 428/192; 428/178; 428/304.4; 428/306.6; 428/309.9; 296/70; 296/191; 264/46.5; 264/46.7; 156/79
[58] Field of Search ......................... 428/247, 304.4, 428/306.9, 246, 166, 179, 71, 76, 159, 306.6, 192, 297, 286, 178, 70; 296/191, 70, 165; 264/46.5, 46.7

[56] References Cited

U.S. PATENT DOCUMENTS 4,830,908  5/1989  Nakajima et al. ..................... 428/426
4,987,029  1/1991  Wagner et al. ..................... 428/319.3

Primary Examiner—Patrick Ryan
Assistant Examiner—Abraham Bahta
Attorney, Agent, or Firm—Lerner, David, Littenberg, Krumholz & Mentlik

[57] ABSTRACT

The present invention relates to an arrangement for panels in vehicles, comprising an outer cover layer (1), an inner carrier (2) and an intermediate layer (3) of a highly heat-reflecting material. The heat-reflecting layer (3) extends continuously, on the one hand with a part in close connection to an area of the cover layer which at least during certain time periods is exposed to heat radiation and accordingly is given an increased temperature, and on the other hand with at least one additional part over an area which has a lower temperature. In this manner, the increased temperature is limited through reflection and through dissipation of heat from the area with the increased temperature.

12 Claims, 4 Drawing Sheets

PANEL STRUCTURE FOR VEHICLES

TECHNICAL FIELD

The present invention relates to an arrangement for panels in vehicles in accordance with the preamble of the following claim 1.

BACKGROUND OF THE INVENTION

Vehicles, for instance motor vehicles, aircraft and speedboats normally have panels of a semi-hard type with a surface which is relatively shape permanent and stable, and which is supported by a carrier which is arranged to absorb impact energy to a high degree, for example in collisions. Such panels are generally produced from a polymer material, for example a layer of PVC which is supported by polyurethane foam. The disadvantage with the materials which best fulfill the demands of impact energy absorbtion and a decorative surface is, compared with panels of for example wood or sheet metal, that the material ages relatively quickly at high temperatures. Particularly within certain geographic areas, the temperature in a sunlit, closed and parked vehicle interior may exceed 100° C., which relatively quickly leads to drying, cracking, miscolouring and even shape changes. High surface temperatures, i.e. hot contact surfaces of panels in a vehicle, of course also has a great influence on the travel comfort.

Previous attempts have been made to solve the problems identified above through an improved reflection of the heat radiation, see for example U.S. Pat. No. 4,987,029. This publication shows two outer layers which comprise aluminium powder. The layers are otherwise composed of polymer materials. These layers are not diffusion-tight for volatile substances in underlying carriers which are normally produced from a polymer foam, which results in an ageing of the surface material. Furthermore, the aluminium powder is present in a relatively low degree of concentration, less than 10%, which gives a limited heat reflection. A non-homogenous layer of this kind has low mechanical strength and is relatively costly.

It is known from U.S. Pat. No. 4,830,908 to provide a vehicle panel with a reflecting metal foil which, however, is arranged at a relatively great distance from the surface being exposed to heat radiation, due to the fact that the cover layer is relatively thick and that an additional layer in the form of a grid is provided. The purpose of the metal foil is in this case to form a carrier, together with the grid structure, for the surface material so that good strength properties are obtained. It is evident from the deep-lying placing of the metal foil that any reflection properties are not intentionally sought.

SUMMARY OF THE INVENTION

The purpose of the present invention is to provide an arrangement, by which the surface temperature of the panel for vehicles may be kept at an acceptable level.

This purpose is achieved by a device in accordance with the present invention, whose features will be apparent from the appended claim 1.

BRIEF DESCRIPTION OF THE DRAWINGS

The invention will now be described in greater detail by way of example and with reference to the accompanying drawings, wherein FIG. 5 shows principally the same structure as FIG. 4, but in an application as a back rest support in a rear seat of a vehicle, while

Figure 1:
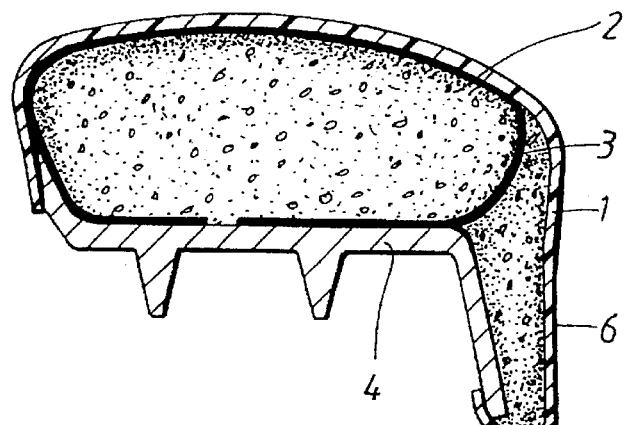
FIG. 1 shows a cross-section of a vehicle panel in a first embodiment in accordance with the present invention.
Figure 2:
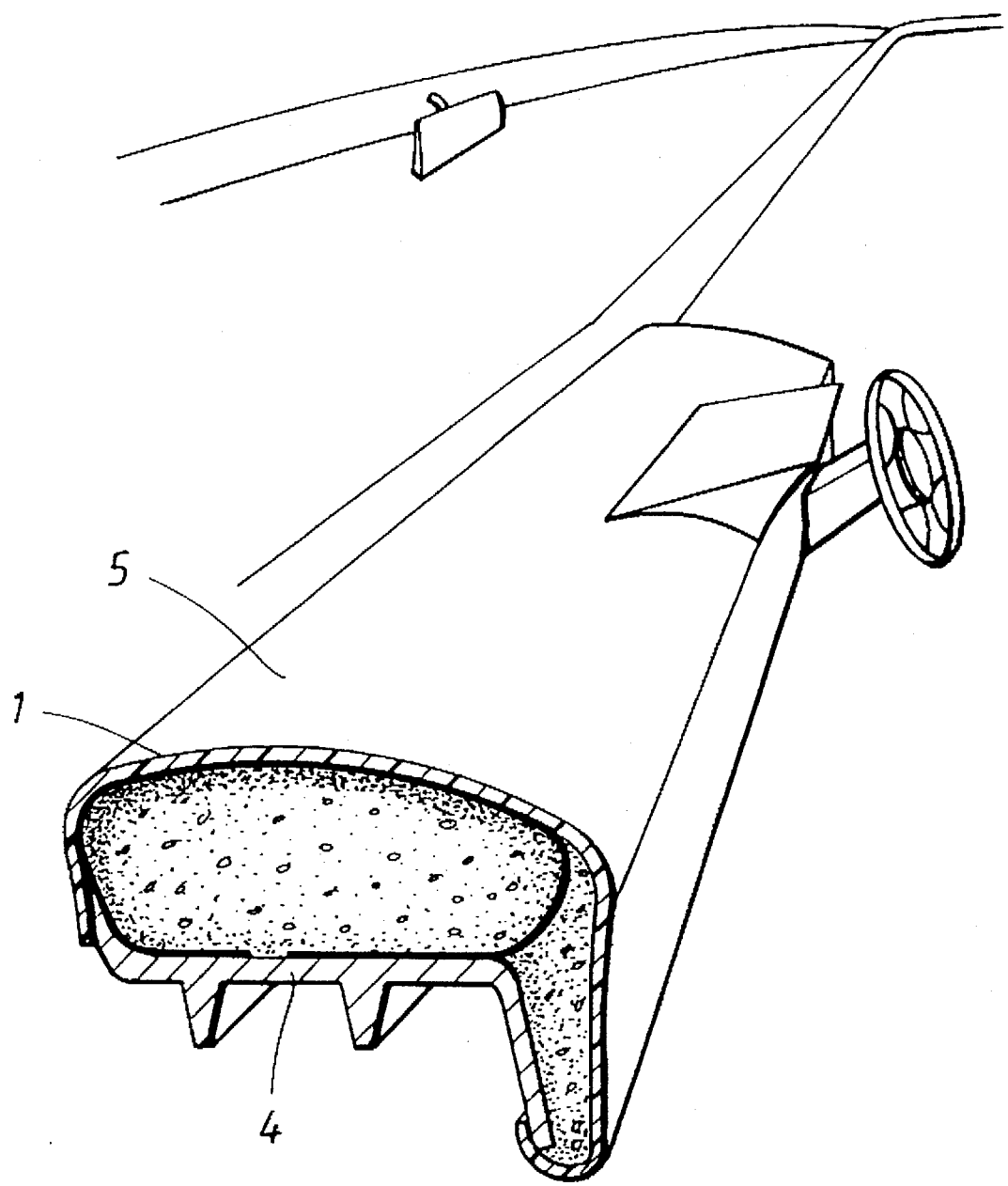
FIG. 2 shows a cross-section of a vehicle panel in accordance with a third embodiment of the device in accordance with the invention.

It is apparent from FIGS. 1 and 2 that the panel, which has been shown as an example, constitutes a dashboard for a motor vehicle, car, truck, bus or the like, for example having a closed passenger compartment, or alternatively an open compartment, i.e. a convertible. The dashboard is formed by an outer cover sheet 1, preferably of a polymer material, for example a so called slush-PVC, alternatively ABS. The cover material is supported by a body or carrier likewise of a polymer material, for example polymer foam, such as polyurethane foam. Between the cover material and the carrier, over an area of the cover material, there is arranged a highly heat-reflecting and heat-conducting layer 3 of for example metal foil, such as aluminium foil. The cover layer is formed with a decorative, semi-hard surface which is relatively shape-permanent for normal forces, but which is deformed through bending, particularly for local impacts, through the flexibility of the cover sheet as well as the compressibility of the porous carrier. If subjected to light strains, the panel resumes its original shape after the strains have ceased. In this manner, the panel is highly impact-absorbing, thereby reducing personal injuries in case of accidents. For extra stiffness in the panel over its entire length, there is arranged a rear support in the form of a profile 4, preferably of a metal or polymer material, which is harder than the cover layer 1. Examples of materials include aluminium or ABS plastic. In the shown example, the cover layer 1 and the rear support 4 together form a casing for the panel body, which thus is completely filled by the porous carrier 2 of foam material.

As is particularly apparent from FIG. 2, the cover layer 1 extends over the outwardly facing visible surfaces of the dashboard in the compartment, whereas the rear support 4 is downwardly turned and is often screened off by additional panels. The heat-conducting foil extends with an area of the foil surface or a part of the foil in close connection to the inside of the cover layer 1 over a corresponding area 5 of the cover layer which is particularly exposed to solar radiation, that is, the upper side of the dashboard, and in the present case also its front edge. In accordance with the invention, at least one additional part of the surface of the foil or a part of the foil extends over areas or parts of the dashboard which are less, or not at all, exposed to solar radiation and therefore have a lower temperature. More precisely, in the example shown in FIGS. 1 and 2 the foil extends to the junction of the edge 6 of the dashboard facing inwardly towards the compartment, so that it ceases to be in contact with the cover layer, extends through the framework or carrier 2 and connects to the inside of the rear support 4 of the panel. Even if not evident from the drawings, the metal foil layer 3 extends over essentially the entire length of the panel and is uninterruptedly continuous, i.e. there is a continuous connection in the aluminium foil between the different parts of which the foil is formed. The foil may however be perforated for example, though may preferably comprise a surface which is continuous so that the surface of the foil is covered at least 50% by a metal layer and thus less than 50% by perforations.

Due to the favourable reflectivity and dissipation of heat of the metal foil 3, the invention serves to considerably decrease the external temperature in the area 5 of the panel which is most exposed to solar radiation. This is achieved by placing the metal foil as close as possible to the area 5 which is exposed to solar radiation, and also by the fact that parts of the metal foil further extend over to areas or parts of the panel having a considerably lower temperature in order to emit heat and thus obtain an equalization of the temperature which, according to the laws of nature, is always strived for. Storage of heat energy in the metal foil in those parts which are situated just in front of the hot area 5 thus takes place as long as the metal foil does not have the same temperature level, at the same time that heat is dissipated to the other parts as long as these parts have a lower temperature level than the temperature of the metal foil just in front of the hot area 5. The surface temperature in the hot area 5 is also kept low through reflection of, primarily, infrared radiation in this hot area 5, which has a total considerable temperature-limiting effect. Tests have shown that the external temperature in conventional dashboards can be for example 105° C. on the upper side and for example approximately 85° C. on the underside, whereas dashboards provided with the device in accordance with the invention present a surface temperature during solar radiation of 94° C., whereas the temperature on the underside for example is in the range from 85° C. to 90° C. A decrease of 10° C. of the surface temperature is calculated to give twice the lifespan for a dashboard.

Figure 3:
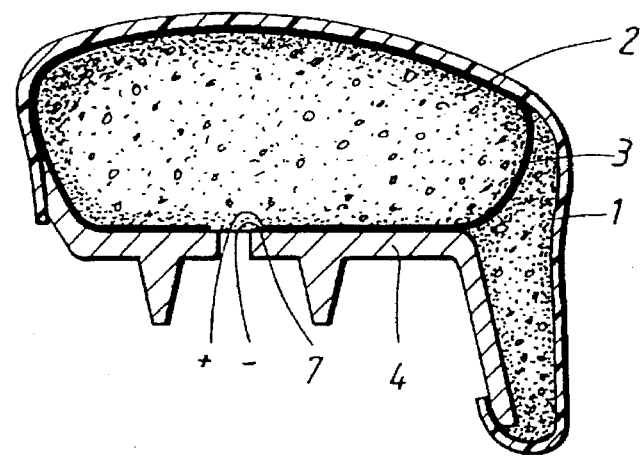
FIG. 3 shows a cross-section of a vehicle panel in accordance with an alternative embodiment.

The embodiment in accordance with FIG. 3 shows an example of a complementary addition of the heat-dissipating function through the fact that the metal foil is included as a component in a thin-film battery 3' which, in addition to the above described heat-reflecting and heat-dissipating properties, is arranged to generate an electric current which can be outputted from an edge part 7 of the thin-film battery at a plus and a minus pole, each of which being connected to a layer in the thin film battery. This can be used for example to drive an electric fan or some other current consumer.

Another alternative embodiment is to arrange the metal foil as a Peltier element, which likewise has a metallic layer with the same properties as has been described above as regards reflection and heat dissipation, and which is also arranged to generate an electric current by means of the fact that it is extended from a part of the element next to the area which has a higher temperature to parts which have a lower temperature. In this manner, different kinds of current consumers may be run, for example an electric fan. Inversely, by supplying the Peltier element with an electric current, the above described heat reflecting and heat dissipating properties may be amplified by using the special properties of the Peltier element through which the upper surface will be cooled and the lower surface will be heated. By changing polarity, the upper surface will instead be heated, which for example may be used in cold climates for heating the area around the windscreen. This can be an advantageous solution in electric cars for example, where engine heating is not available.

Figure 4:
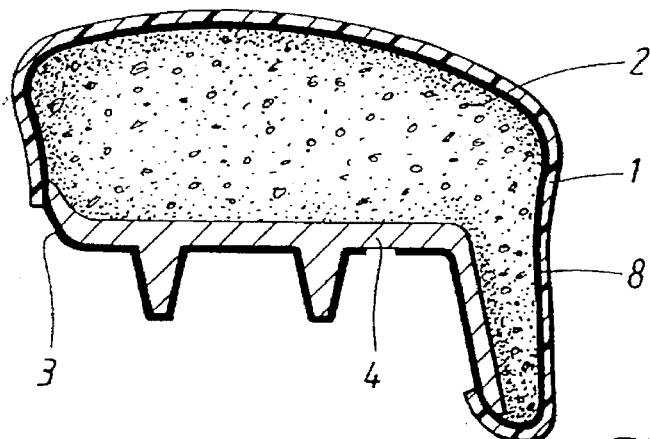
FIG. 4 shows the vehicle panel of FIG. 1, together with parts of the interior of a vehicle compartment in a perspective view.

FIG. 4 shows yet another embodiment, according to which the heat-conducting layer 3 not only extends quite closely at the inside of the cover layer 1 over the entire surface of the cover layer, but also extends at the outside of the rear support 4. This solution is particularly suitable in those cases where the projecting part 8 of the cover layer 1 is also exposed to heat radiation. Through the fact that in this case a larger part of the heat-dissipating layer is exposed to the higher temperature and that, in this respect, the demand for dissipation of heat increases, the parts of this layer which are situated in the area with a lower temperature have been given a particularly advantageous placing for heat emission by both heat-radiation and heat-convection. This has been assured by the placing of the layer at the outside of the rear support 4 instead of at its inside, whereby radiation and convection towards the environment can be carried out in an easier way. This solution is possible particularly in those applications where the heat-conducting layer is not exposed to far too high mechanical strain.

Figure 5:
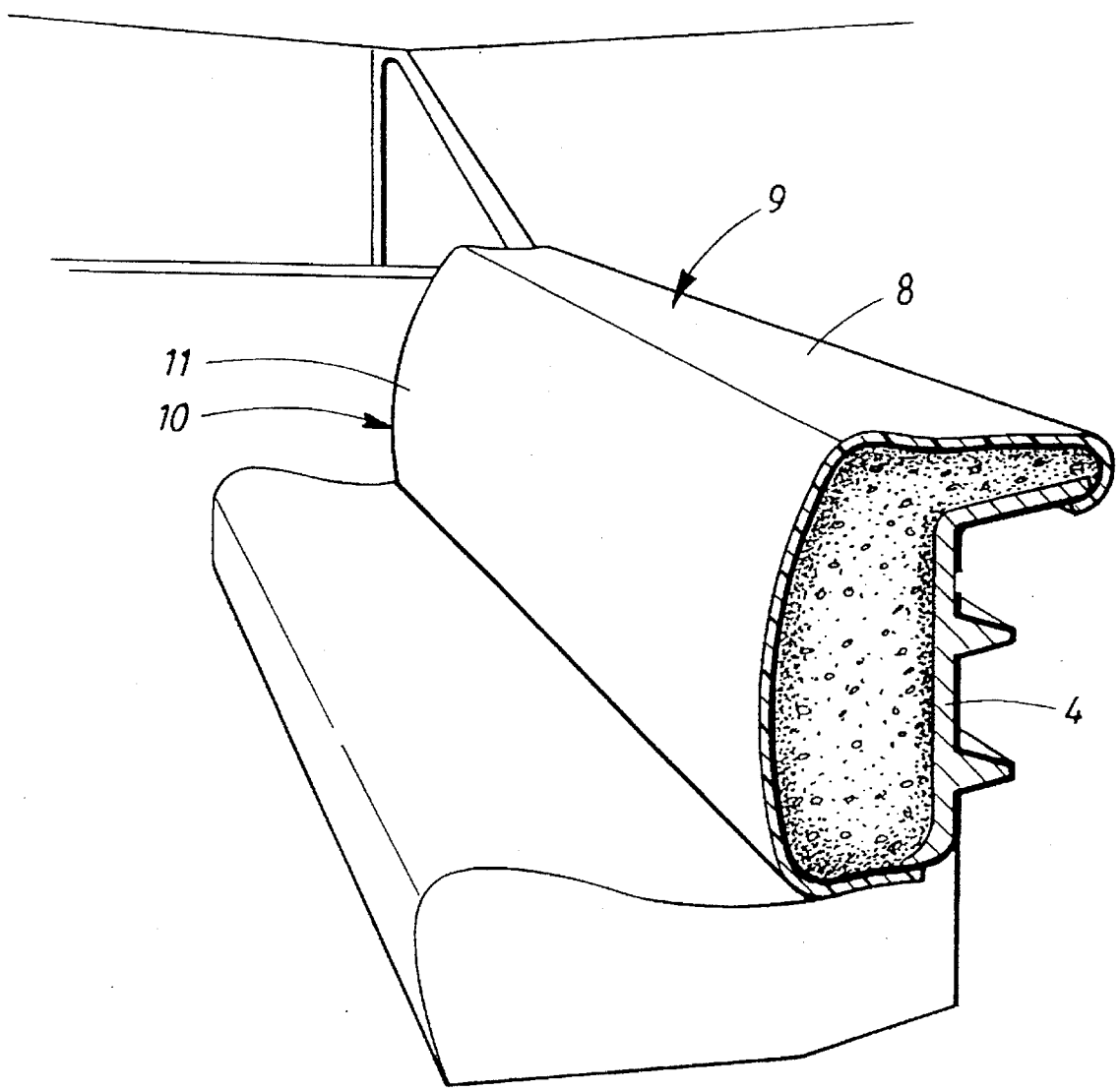

FIG. 5 shows an example of just the application of the solution shown in FIG. 3, namely in the form of an integration of a panel in the form of a parcel shelf 9 and a back rest 10. In this connection, both the surface 11 of the back rest as well as the surface 8 of the parcel shelf 9 are exposed to heat radiation, whereas the rear support 4 is turned inwardly towards the luggage boot, where there normally is a lower temperature.

Figure 6:
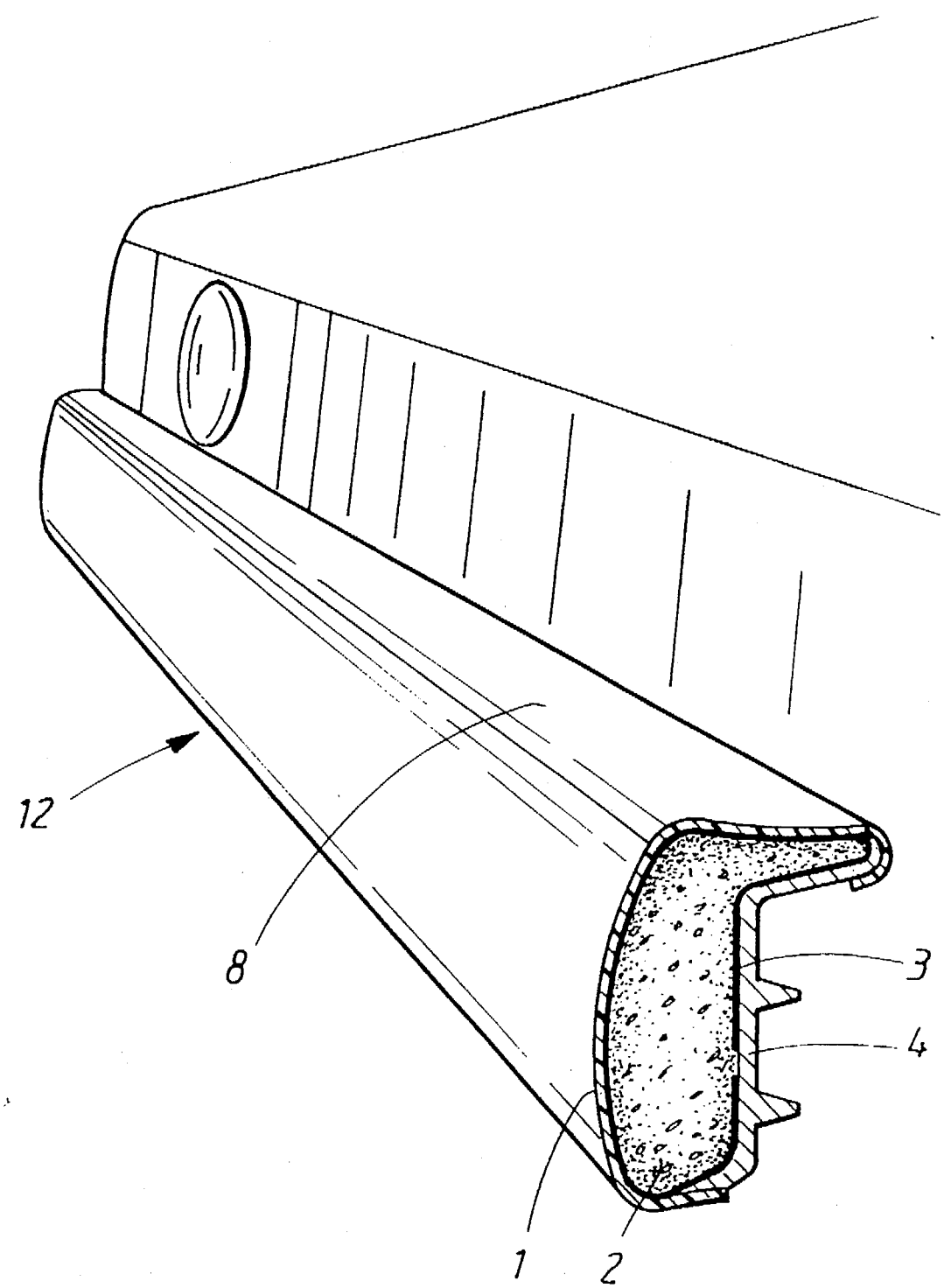
FIG. 6 shows the vehicle panel in accordance with the invention in an alternative embodiment in the form of a vehicle bumper.

FIG. 6, finally, shows an intermediate solution which forms a combination of the solution in accordance with FIG. 1 and FIG. 3, in which the panel is in the form of a bumper 12 of a motor vehicle and the relatively plane surface 8 is made up of the upper side of the bumper which, just like the front side, is often exposed to strong solar radiation. The backside of the bumper, on the other hand, is well protected from solar radiation and therefore constitutes the area with the lower temperature. In this case, the backside is exposed to high mechanic wear and other environmental effects, which has led to the choice of arranging the heat-conducting layer 3 along its entire extent at the inside of the outer cover layer 1 as well as the rear support 4. Also in this case, a carrier 2 of a non-rigid energy-absorbing material is present, whereas the cover layer 1 is formed by a semi-hard, flexible and thus non-rigid material.

In all embodiments, the heat-conducting layer forms an integrated part of the panel with cover layer and carrier and is produced either in connection with the production of the cover layer in the shape of a web by, for example, calendering. In applications in which the cover layer is of a semi-hard type, such as in dashboards, bumpers and the like, the panel is generally produced in a mould in which the cover layer is first formed, after which the heat-conducting layer is applied in the form of either a metal foil or through spraying of a metallic solution, alternatively through vaporization, after which the carrier is forced to fill the inner parts of the mould in the form of a mass which congeals.

The invention is not limited to the embodiments described above and shown in the drawings, but may be varied within the scope of the appended claims. For example, many types of panels can be provided with a layer which dissipates heat, such as door panels on the inside of doors, empty parcel shelves, etc. When the heat conducting layer is formed as a thin-film battery in a large number of panels in a vehicle, these may in principle be used together as an energy source for the propulsion of an electric vehicle. These types of batteries are of course rechargeable.

I claim:
1. A vehicle panel, comprising:
 (a) an outer cover layer, forming an outwardly facing visible front surface of said panel, said outer cover layer including a portion which during at least certain time periods, is exposed to heat radiation thereby creating an area of increased temperature;

(b) an inner carrier, forming a body of said panel; and (c) a heat-reflecting and heat-conducting layer of a highly heat-reflecting and heat-conducting material, said heat-reflecting and heat-conducting layer extending continuously about said panel, with a portion of said heat-reflecting and heat conducting layer located at the interior of said outer cover layer at said area of increased temperature, and with at least one other portion of said heat-reflecting and heat-conducting layer located at a rearwardly facing area of said outer cover layer which has a lower temperature, whereby said increased temperature is limited by reflection and by dissipation of heat from said area of increased temperature.

2. A panel as claimed in claim 1, wherein said heat-reflecting and heat-conducting layer comprises a metal foil.

3. A panel as claimed in claim 2, wherein said metal is aluminum.

4. A panel as claimed in claim 1, wherein said panel has a forward side, which is exposed to heat radiation, and a rearward side, which has a lower temperature, said heat-reflecting and heat-conducting layer extending from said forward side to said rearward side of said panel.

5. A panel as claimed in claim 1, wherein said heat-reflecting and heat-conducting layer is full-covering and diffusion-tight of said panel.

6. A panel as claimed in claim 1, wherein said heat-reflecting and heat-conducting layer is perforated.

7. A panel as claimed in claim 1, wherein said heat-reflecting and heat-conducting layer is infrared radiation reflecting.

8. A panel as claimed in claim 1, wherein said heat-reflecting and heat-conducting layer is integrated with a Peltier element.

9. A panel as claimed in claim 1, wherein said heat-reflecting and heat-conducting layer constitutes a part of a Peltier element.

10. A panel as claimed in claim 1, wherein said heat-reflecting and heat-conducting layer is integrated with a thin-film battery.

11. A panel as claimed in claim 1, wherein said heat-reflecting and heat-conducting layer constitutes a part of a thin-film battery.

12. A vehicle panel, comprising:

(a) an outer cover layer, forming an outwardly facing visible front surface of said panel, said outer cover layer including a portion which, during at least certain time periods, is exposed to heat radiation thereby creating an area of increased temperature;

(b) an inner carrier, forming a body of said panel;

(c) a rear support member; and (d) a heat-reflecting and heat-conducting layer of a highly heat-reflecting and heat-conducting material, said heat-reflecting and heat-conducting layer extending continuously about said panel, with a portion of said heat-reflecting and heat-conducting layer located at the interior of said outer cover layer at said area of increased temperature, and with at least one other portion of said heat-reflecting and heat-conducting layer connected to said rear support member which has a lower temperature, whereby said increased temperature is limited by reflection and by dissipation of heat from said area of increased temperature.

* * * * *